(12) United States Patent
Yamasaki et al.

(10) Patent No.: US 10,749,834 B2
(45) Date of Patent: Aug. 18, 2020

(54) INFORMATION PROCESSING APPARATUS, INFORMATION PROCESSING METHOD, PROGRAM, AND INFORMATION PROCESSING SYSTEM FOR SENDING A MESSAGE WITH AN IMAGE ATTACHED THERETO

(71) Applicant: SONY CORPORATION, Tokyo (JP)

(72) Inventors: Rio Yamasaki, Tokyo (JP); Naoki Nagano, Tokyo (JP); Taiji Ito, Kanagawa (JP); Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 15/529,268

(22) PCT Filed: Dec. 2, 2015

(86) PCT No.: PCT/JP2015/083841
§ 371 (c)(1),
(2) Date: May 24, 2017

(87) PCT Pub. No.: WO2016/098589
PCT Pub. Date: Jun. 23, 2016

(65) Prior Publication Data
US 2017/0264586 A1    Sep. 14, 2017

(30) Foreign Application Priority Data

Dec. 15, 2014    (JP) .................................. 2014-253221

(51) Int. Cl.
*H04L 12/58*    (2006.01)
*G06F 13/00*    (2006.01)
(Continued)

(52) U.S. Cl.
CPC .............. *H04L 51/32* (2013.01); *G06F 13/00* (2013.01); *G06F 16/51* (2019.01); *G06F 16/583* (2019.01);
(Continued)

(58) Field of Classification Search
CPC ........ G06F 13/00; G06F 16/51; G06F 16/583; G06Q 50/10; H04L 51/02; H04L 51/32; H04L 51/10; H04L 51/08
See application file for complete search history.

(56) References Cited

U.S. PATENT DOCUMENTS 7,953,735 B2 *    5/2011    Yamamoto ........... G11B 27/105
                                                            707/736
8,611,617 B1 *    12/2013   Baluja ................ G06K 9/00684
                                                            382/124
(Continued)

FOREIGN PATENT DOCUMENTS

JP    2002-083061    3/2002
JP    2002-244975    8/2002
(Continued)

*Primary Examiner* — Alina A Boutah
(74) *Attorney, Agent, or Firm* — Paratus Law Group, PLLC

(57) ABSTRACT

There is provided an information processing apparatus, an information processing method, a program, and an information processing system that are capable of proactively supporting continuous communication, the information processing apparatus including: an acquiring unit that acquires a predetermined number of message content items, as candidates to be sent, from a plurality of message content items classified as a category corresponding to an image used for communication among a plurality of categories into which the message content items are classified; and an option creating unit that creates an option for prompting a selection of the message content item to be sent from the predetermined number of message content items acquired by the (Continued)

acquiring unit, and exhibits the option at a predetermined timing. The present technology can be applied to, for example, an information processing apparatus that constitutes a communication support system.

14 Claims, 13 Drawing Sheets

(51) Int. Cl.
*G06Q 10/10* (2012.01)
*G06F 16/51* (2019.01)
*G06F 16/583* (2019.01)

(52) U.S. Cl.
CPC ........... G06Q 10/107 (2013.01); H04L 51/02 (2013.01); H04L 51/08 (2013.01); H04L 51/10 (2013.01)

(56) References Cited

U.S. PATENT DOCUMENTS

| | | | | |
|---|---|---|---|---|
| 8,843,825 | B1* | 9/2014 | Whitman | G06Q 50/01 715/730 |
| 9,122,912 | B1* | 9/2015 | Briskin | G06K 9/00677 |
| 9,830,631 | B1* | 11/2017 | Dhua | G06K 9/6202 |
| 10,075,544 | B2* | 9/2018 | Sutou | G06F 13/00 |
| 2003/0123737 | A1* | 7/2003 | Mojsilovic | G06K 9/626 382/224 |
| 2004/0181552 | A1* | 9/2004 | Milne | G06F 16/583 |
| 2007/0019864 | A1* | 1/2007 | Koyama | G06K 9/00456 382/218 |
| 2007/0047011 | A1* | 3/2007 | Yamashita | H04N 1/00209 358/402 |
| 2010/0260426 | A1* | 10/2010 | Huang | G06K 9/20 382/218 |
| 2010/0278396 | A1* | 11/2010 | Mitsuhashi | G06K 9/00624 382/118 |
| 2010/0303342 | A1* | 12/2010 | Berg | G06F 16/583 382/155 |
| 2012/0092515 | A1* | 4/2012 | Yim | H04N 5/23222 348/222.1 |
| 2012/0179716 | A1* | 7/2012 | Takami | G06Q 30/02 707/771 |
| 2012/0192085 | A1* | 7/2012 | Lu | G06Q 10/107 715/752 |
| 2013/0054620 | A1* | 2/2013 | Stokes | G06K 9/00483 707/749 |
| 2013/0101181 | A1* | 4/2013 | Hsi | G06F 16/583 382/118 |
| 2013/0132444 | A1* | 5/2013 | Chen | H04N 1/00132 707/804 |
| 2014/0079325 | A1* | 3/2014 | Takahashi | H04N 21/4122 382/224 |
| 2014/0101152 | A1* | 4/2014 | Chen | G06T 11/60 707/736 |
| 2014/0126830 | A1* | 5/2014 | Suganuma | G06K 9/627 382/225 |
| 2014/0341482 | A1* | 11/2014 | Murphy-Chutorian | G06K 9/00677 382/284 |
| 2015/0089391 | A1* | 3/2015 | Lu | G06Q 10/107 715/752 |
| 2015/0142902 | A1* | 5/2015 | Shirai | H04L 51/08 709/206 |
| 2015/0169993 | A1* | 6/2015 | Rabinovich | G06F 16/51 382/224 |
| 2015/0199560 | A1* | 7/2015 | Gokturk | G06F 16/583 382/195 |
| 2015/0227782 | A1* | 8/2015 | Salvador | G06F 16/583 382/118 |
| 2015/0332087 | A1* | 11/2015 | Joshi | G06K 9/00 382/203 |
| 2015/0370798 | A1* | 12/2015 | Ju | G06F 16/9535 707/748 |
| 2016/0026859 | A1* | 1/2016 | Chiba | G06K 9/342 382/199 |
| 2017/0187813 | A1* | 6/2017 | Li | H04L 67/306 |
| 2017/0264954 | A1* | 9/2017 | Nakagawa | G06F 13/00 |
| 2017/0277970 | A1* | 9/2017 | Sigal | G06K 9/52 |

FOREIGN PATENT DOCUMENTS

| | | |
|---|---|---|
| JP | 2004-297485 | 10/2004 |
| JP | 2004-343556 | 12/2004 |
| JP | 2010-187284 | 8/2010 |
| JP | 2011-165046 | 8/2011 |
| JP | 2014-134903 | 7/2014 |
| WO | WO2014/013604 A1 | 1/2014 |

* cited by examiner

INFORMATION PROCESSING APPARATUS, INFORMATION PROCESSING METHOD, PROGRAM, AND INFORMATION PROCESSING SYSTEM FOR SENDING A MESSAGE WITH AN IMAGE ATTACHED THERETO

CROSS REFERENCE TO PRIOR APPLICATION

This application is a National Stage Patent Application of PCT International Patent Application No. PCT/JP2015/083841 (filed on Dec. 2, 2015) under 35 U.S.C. § 371, which claims priority to Japanese Patent Application No. 2014-253221 (filed on Dec. 15, 2014), which are all hereby incorporated by reference in their entirety.

TECHNICAL FIELD

The present disclosure relates to an information processing apparatus, an information processing method, a program, and an information processing system, and more particularly to, an information processing apparatus, an information processing method, a program, and an information processing system that are capable of proactively supporting continuous communication.

BACKGROUND ART

Along with the recent aging of society, elderly persons living alone have been increasing. In order to prevent the social isolation of those persons, many apparatuses and services for communication between the elderly persons and their families are provided.

However, the elderly persons have difficulty in handling devices and cannot send messages with ease in some cases. Further, their families as the other party of the communication have difficulty in voluntarily taking time for the communication, and thus miss the opportunity to send messages in some cases. For those reasons, a situation difficult to continue communication between both sides has occurred.

In this regard, for example, many techniques aimed at enabling the elderly person side to easily issue a message have been developed.

For example, Patent Literature 1 discloses the invention in which, when a talking voice is input, voice data reaches the other party by e-mail. Further, Patent Literature 2 discloses the invention in which life information is accumulated while one has a regular life, and his/her family can access that information at any time. Furthermore, Patent Literature 3 discloses the invention in which an operator remotely operates a device instead of a user and supports report of the current situation to a specified destination. Moreover, Patent Literature 4 discloses the invention to automatically create a reply message in accordance with a sender or content of a received message and send back a reply, to maintain the motivation of the sender of the message.

CITATION LIST

Patent Literature

Patent Literature 1: Japanese Patent Application Laid-open No. 2004-343556
Patent Literature 2: Japanese Patent Application Laid-open No. 2010-187284
Patent Literature 3: Japanese Patent Application Laid-open No. 2002-83061
Patent Literature 4: Japanese Patent Application Laid-open No. 2011-165046

DISCLOSURE OF INVENTION

Technical Problem

However, the inventions disclosed in Patent Literatures 1 to 4 as described above serve to eliminate time and effort, complexity of operations, or the like of any one of the sender and the receiver. For that reason, it takes time and effort for both of an elderly person and his/her family side to communicate, and eventually it is assumed that the communication is not continued.

The present disclosure has been made in view of the circumstances as described above and is capable of proactively supporting continuous communication.

Solution to Problem

An information processing apparatus according to one aspect of the present disclosure includes: an acquiring unit that acquires a predetermined number of message content items, as candidates to be sent, from a plurality of message content items classified as a category corresponding to an image used for communication among a plurality of categories into which the message content items are classified; and an option creating unit that creates an option for prompting a selection of the message content item to be sent from the predetermined number of message content items acquired by the acquiring unit, and exhibits the option at a predetermined timing.

An information processing method or a program according to one aspect of the present disclosure includes the steps of: acquiring a predetermined number of message content items, as candidates to be sent, from a plurality of message content items classified as a category corresponding to an image used for communication among a plurality of categories into which the message content items are classified; and creating an option for prompting a selection of the message content item to be sent from the acquired predetermined number of message content items, and exhibiting the option at a predetermined timing.

An information processing system according to one aspect of the present disclosure includes: a sending-side information processing apparatus including a choosing unit that chooses the predetermined number of images as candidates to be sent, a sending content acquiring unit that acquires a predetermined number of message content items, as candidates to be sent, from a plurality of message content items classified as categories respectively corresponding to the predetermined number of images chosen by the choosing unit, among a plurality of categories into which the message content items are classified, an option creating unit that creates the option for prompting a selection of a message to be sent from the messages in which the predetermined number of images and the predetermined number of message content items are respectively combined, and exhibits the option at a predetermined timing, the predetermined number of message content items corresponding to the images and being acquired by the acquiring unit, and a sending unit that sends the message selected to be sent among the options; and a receiving-side information processing apparatus including a receiving unit that receives a message attached with the image, and a reply content acquiring unit that acquires the predetermined number of message content items for sending a reply to the message, from the category corresponding to the image attached to the message received by the receiving unit.

In one aspect of the present disclosure, a predetermined number of message content items are acquired, as candidates to be sent, from a plurality of message content items classified as a category corresponding to an image used for communication among a plurality of categories into which the message content items are classified, and an option for prompting a selection of the message content item to be sent is created from the acquired predetermined number of message content items, and exhibited at a predetermined timing.

Advantageous Effects of Invention

According to one aspect of the present disclosure, it is possible to proactively support continuous communication.

MODE(S) FOR CARRYING OUT THE INVENTION

Hereinafter, a specific embodiment to which the present technology is applied will be described in detail with reference to the drawings.

Figure 1:
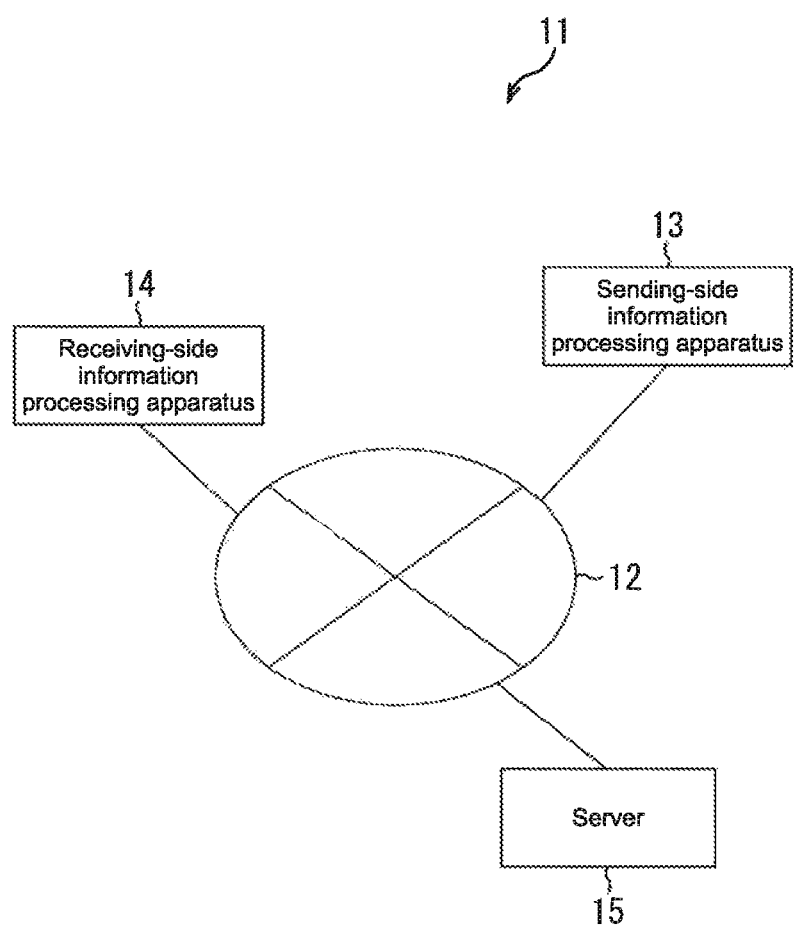
FIG. 1 is a block diagram showing a configuration example of one embodiment of a communication support system to which the present technology is applied.

FIG. 1 is a block diagram showing a configuration example of one embodiment of a communication support system to which the present technology is applied.

As shown in FIG. 1, a communication support system 11 is constituted of a sending-side information processing apparatus 13, a receiving-side information processing apparatus 14, and a server 15 connected to one another via a network 12 such as the Internet.

As will be described later with reference to FIGS. 2 to 4, the sending-side information processing apparatus 13 prompts a sender to send a message at a predetermined timing and sends the message to the receiving-side information processing apparatus 14 via the network 12 according to an operation by the sender. For example, the sending-side information processing apparatus 13 is desirably constituted of a versatile smartphone terminal used by a family who communicate with an elderly person.

As will be described later with reference to FIGS. 5 to 7, the receiving-side information processing apparatus 14 exhibits, at the timing at which the message sent from the sending-side information processing apparatus 13 is received, the message to a receiver and causes the receiver to select and send a reply message. For example, the receiving-side information processing apparatus 14 is desirably constituted of a tablet terminal equipped with a large-screen touch panel that is accessible to elderly persons.

As will be described later with reference to FIG. 8, the server 15 analyzes a user preference on the basis of accumulated user information and sends, at a timing based on an analysis result, a sending prompting notification that prompts sending of a message to the sending-side information processing apparatus 13.

The communication support system 11 thus configured is capable of prompting a sender (family) on the sending-side information processing apparatus 13 side to send a message at an appropriate timing, and sending a reply message by a simplified method for a receiver (elderly person) on the receiving-side information processing apparatus 14 side. This enables the communication support system 11 to proactively support continuous communication.

Figure 2:
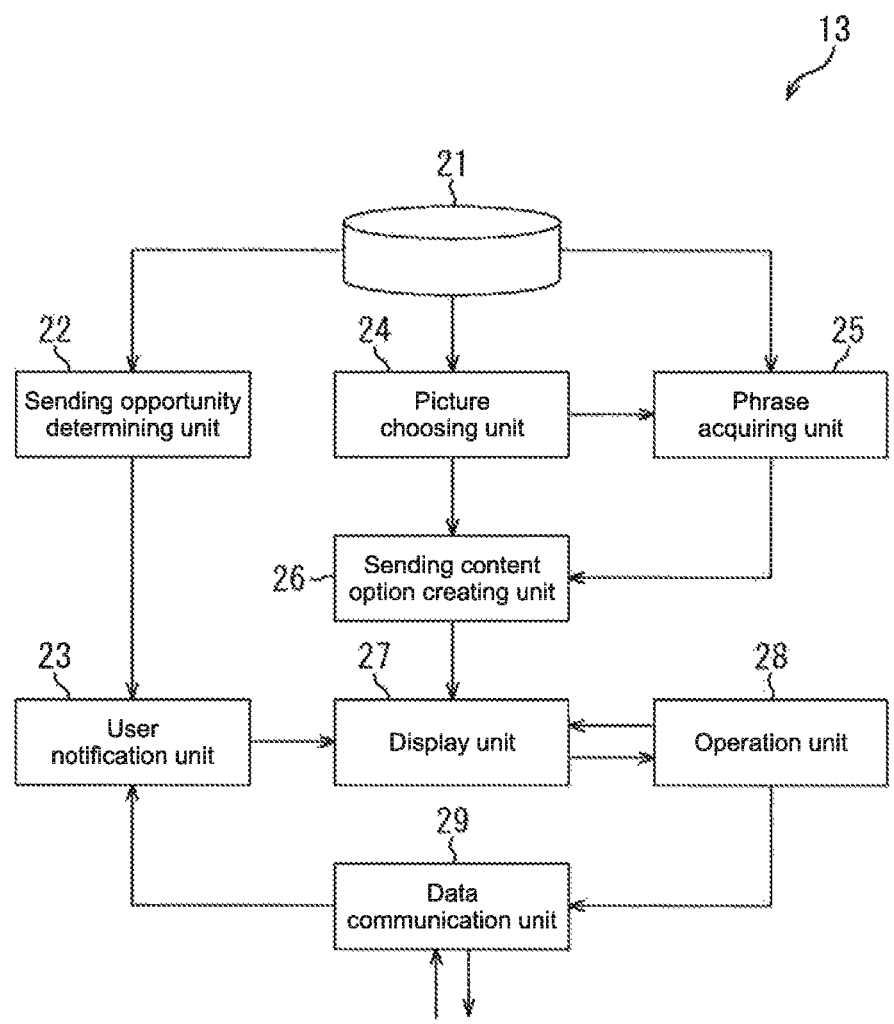
FIG. 2 is a block diagram showing a configuration example of a sending-side information processing apparatus.

Next, FIG. 2 is a block diagram showing a configuration example of the sending-side information processing apparatus 13 of FIG. 1.

As shown in FIG. 2, the sending-side information processing apparatus 13 includes a storage unit 21, a sending opportunity determining unit 22, a user notification unit 23, a picture choosing unit 24, a phrase acquiring unit 25, a sending content option creating unit 26, a display unit 27, an operation unit 28, and a data communication unit 29.

The storage unit 21 includes, for example, a hard disk drive, a semiconductor memory, or the like, stores various types of data necessary for the sending-side information processing apparatus 13 to perform information processing and manages those types of data. For example, the storage unit 21 stores pictures (images) taken with a camera (not shown in the figure) of the sending-side information processing apparatus 13, the history of messages sent from the sending-side information processing apparatus 13, templates in which stereotyped phrases used for messages sent from the sending-side information processing apparatus 13 are registered, and the like. Further, the templates are classified into a plurality of categories according to, for example, content of the pictures, and a phrase associated with the content of each picture is registered therein.

The sending opportunity determining unit 22 accesses, for example, the storage unit 21 to acquire information on the number of pictures, which indicates the number of pictures stored in the storage unit 21. On the basis of the number of pictures, the sending opportunity determining unit 22 determines whether a timing to issue a notification of sending a message has come. For example, when an increased number of pictures, which are increased from the last sending of the message, is the predetermined number or more, the sending opportunity determining unit 22 determines that a timing to issue a notification of sending a message has come.

In the case of such a determination, the sending opportunity determining unit 22 instructs the user notification unit 23 to perform user notification to send a message. It should be noted that when the increased number is less than the predetermined number, the sending opportunity determining unit 22 determines that a timing to issue a notification of sending a message has not come. In this case, user notification to send a message is not performed. Further, the predetermined number to be a reference with which the sending opportunity determining unit 22 determines a timing to issue a notification of sending a message is determined to be an optimal number by, for example, analyzing user information managed by a user information management unit 81 of the server 15 of FIG. 8, which will be described later.

When instructed to perform user notification to send a message by the sending opportunity determining unit 22, the user notification unit 23 displays, on the display unit 27, a sending prompting notification screen to prompt sending of a message. For example, as shown in FIG. 3, a button 32 displaying "Send" and a button 33 displaying "Not send" are displayed on a sending prompting notification screen 31, together with a phrase "Funny pictures are accumulated! Send them?" in a speech balloon of a character of the communication support system. The button 32 is operated by a sender when a message is sent, and the button 33 is operated by the sender when a message is not sent. Further, the user notification unit 23 displays a similar sending prompting notification screen on the display unit 27 also when receiving a sending prompting notification sent by the server 15, as will be described later.

In the case where the sender selects attaching a picture to the message, the picture choosing unit 24 chooses a predetermined number of pictures appropriate to the sender, as candidates to be sent, from the pictures stored in the storage unit 21 and supplies the predetermined number of pictures to the sending content option creating unit 26. Moreover, the picture choosing unit 24 performs image recognition on the chosen pictures and notifies the phrase acquiring unit 25 of a recognition result in which what is shown up, i.e., content of each picture, is recognized. Further, the picture choosing unit 24 may preferentially select an image, content of which can be recognized by image recognition, for example.

In the case where the sender selects sending a message, the phrase acquiring unit 25 selects a specific phrase from the templates stored in the storage unit 21 and supplies the specific phrase to the sending content option creating unit 26. For example, in the case where a picture is attached to the message, on the basis of the recognition result of the content of the pictures notified by the picture choosing unit 24, the phrase acquiring unit 25 acquires phrases associated with the content of those pictures. At that time, as described above, the templates have registered phrases that are classified into a plurality of categories according to the content of the pictures, and the phrase acquiring unit 25 acquires the phrases, as candidates to be sent, from a category corresponding to the content of a recognized picture. Further, in the case where the picture choosing unit 24 has not recognized the content of the pictures, the phrase acquiring unit 25 acquires phrases independent of the content of the pictures. Alternatively, in the case where a picture is not attached to the message, the phrase acquiring unit 25 acquires phrases randomly constituted of greetings according to the seasons, talked-about phrases that can be acquired via the network 12, or the like.

The sending content option creating unit 26 combines the phrases, which are supplied from the phrase acquiring unit 25, with the predetermined number of pictures, which are supplied from the picture choosing unit 24, to create sending content options that cause the sender to select sending content. The sending content option creating unit 26 then displays, on the display unit 27, a sending content selection screen for causing the sender to select a sending content option to be sent from a predetermined number sending content options.

Figure 4:
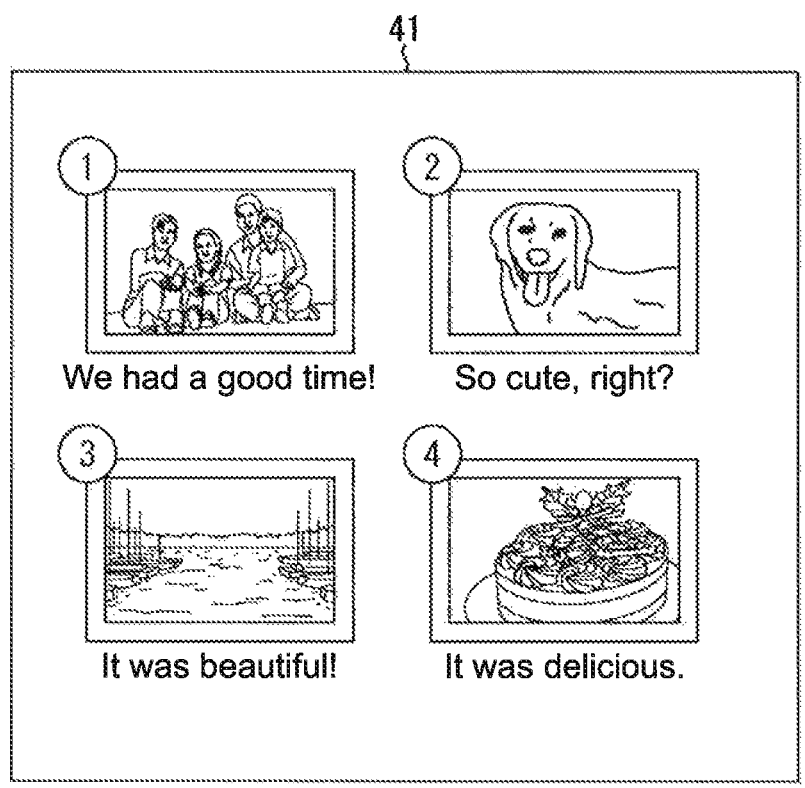
FIG. 4 is a diagram showing a display example of a sending content selection screen.

For example, FIG. 4 shows an example a sending content selection screen 41 that prompts selection of sending content, in each of which a picture is attached to a message. The sending content selection screen 41 of FIG. 4 displays four sending content options. In the first sending content option, a picture of a family on their trip and a phrase associated with the content of the picture "We had a good time!" are combined. Further, in the second sending content option, a picture of a pet and a phrase associated with the content of the picture "So cute, right?" are combined, and in the third sending content option, a picture of a landscape and a phrase associated with the content of the picture "It was beautiful!" are combined. Further, in the fourth sending content option, a picture of a cake and a phrase associated with the content of the picture "It was delicious." are combined.

It should be noted that the number of sending content options displayed on the sending content selection screen 41 may be other than four. The sending content option creating unit 26 can create and display sending content options in number that the sender is easy to select, for example, about two to six sending content options.

Figure 3:
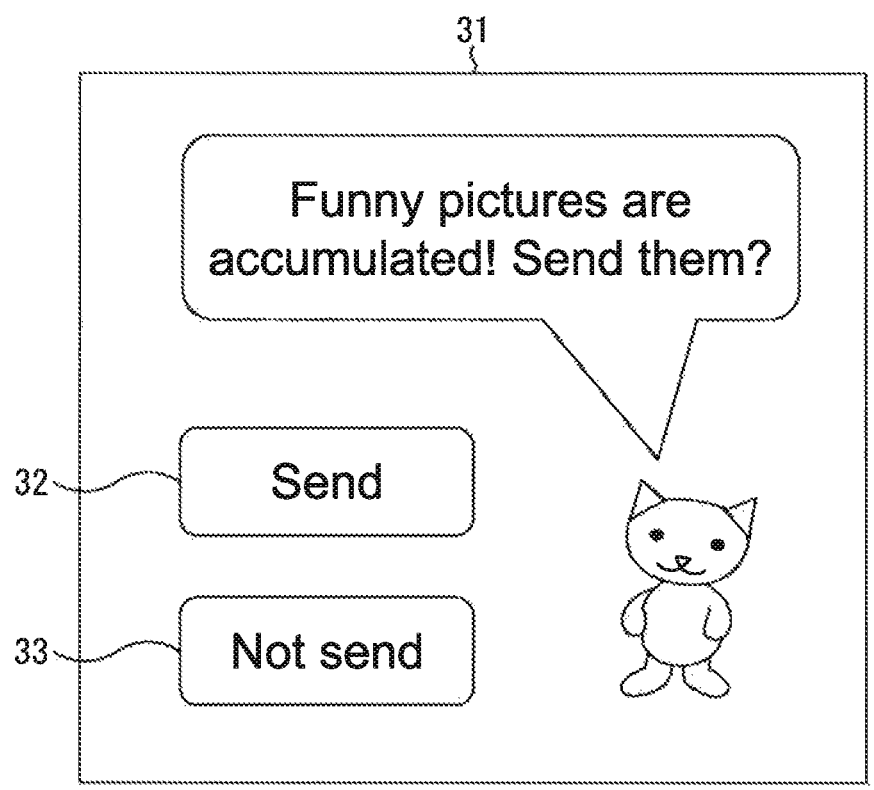
FIG. 3 is a diagram showing a display example of a sending prompting notification screen.

The display unit 27 is constituted of, for example, a liquid crystal display or an organic EL (Electra Luminescence) display, and displays the sending prompting notification screen 31 of FIG. 3, the sending content selection screen 41 of FIG. 4, and the like.

The operation unit 28 is constituted of a touch panel, a button, a microphone, and the like, and receives an operation input according to an operation of the sender and make a determination based on the operation input. For example, when the sender makes an operation (for example, touch) on the button 32 displayed on the sending prompting notification screen 31 of FIG. 3, the operation unit 28 determines that the sender has made an operation input to send a message. Further, for example, when the sender specifies any of the sending content options (e.g., reads a number of a sending content option) displayed on the sending content selection screen 41 of FIG. 4, the operation unit 28 determines that the specified sending content is a sending target.

The data communication unit 29 performs communication with the receiving-side information processing apparatus 14 and the server 15 via the network 12 of FIG. 1 and, for example, sends a message of the sending content, which is specified as a sending target by the sender from the sending content selection screen 41. Further, the data communication unit 29 receives a sending prompting notification sent from the server 15 and supplies the sending prompting notification to the user notification unit 23, as will be described later.

The sending-side information processing apparatus 13 is configured in such a manner and can send a message by a simpler operation and appropriately prompt communication with a receiver.

It should be noted that in the sending-side information processing apparatus 13, the sending opportunity determining unit 22 may determine a timing to send a message according to, in addition to the number of pictures as described above, a specific date and time (birthday, anniversary, date and time at which an event is held, etc.) based on attributes of the sender, for example.

Further, in the sending-side information processing apparatus 13, the picture choosing unit 24 can preferentially choose, for example, a picture of many people, a picture matched with a taste (preference) of a receiver, a picture (for example, of cooking, pet, landscape, etc.) that is easy to select a phrase associated therewith, a picture of a person who is previously registered as a family and has high priority, a picture of a child, and the like. Further, the picture choosing unit 24 may choose a picture on the basis of the sending history of messages. In such a manner, selecting a picture appropriate to the sender on the basis of the content of a picture or the like can continue better communication.

Figure 5:
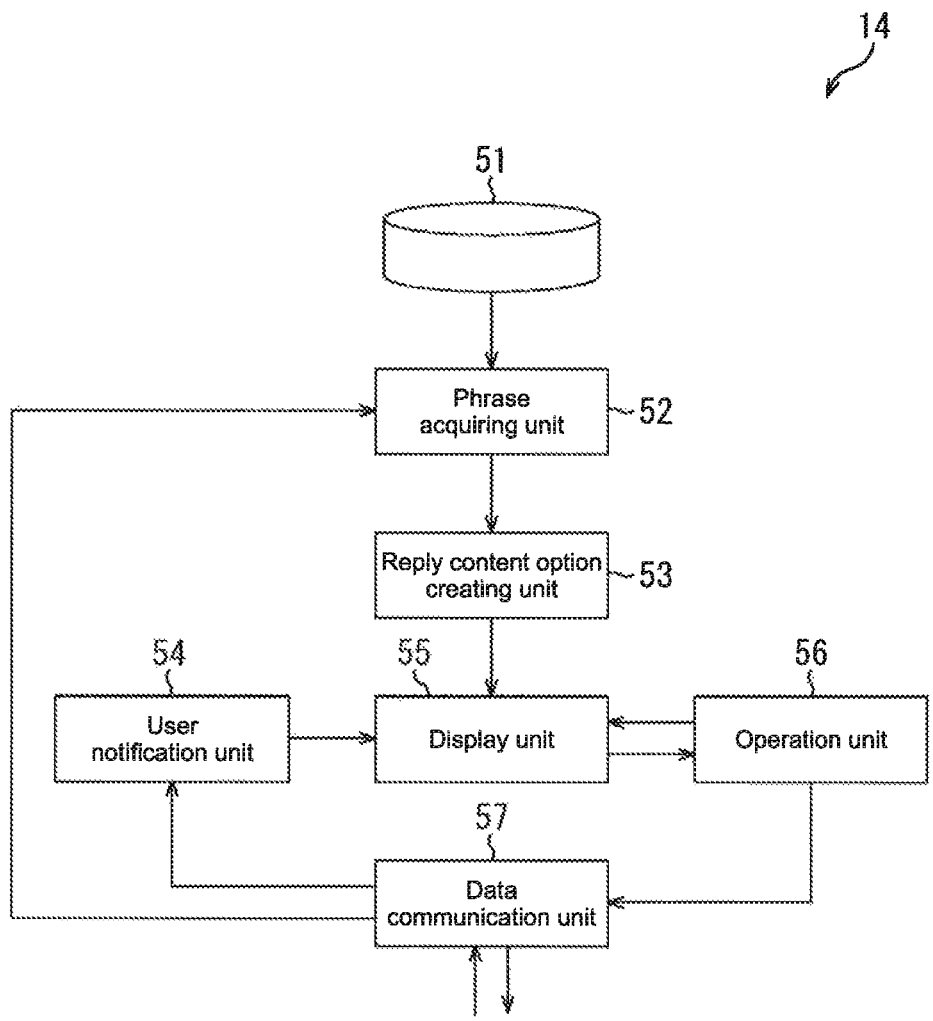
FIG. 5 is a block diagram showing a configuration example of a receiving-side information processing apparatus.

Next, FIG. 5 is a block diagram showing a configuration example of the receiving-side information processing apparatus 14 of FIG. 1.

As shown in FIG. 5, the receiving-side information processing apparatus 14 includes a storage unit 51, a phrase acquiring unit 52, a reply content option creating unit 53, a user notification unit 54, a display unit 55, an operation unit 56, and a data communication unit 57.

The storage unit 51 includes, for example, a hard disk drive, a semiconductor memory, or the like, stores various types of data necessary for the receiving-side information processing apparatus 14 to perform information processing and manages those types of data. For example, the storage unit 51 stores templates in which stereotyped answer phrases used for reply messages sent from the receiving-side information processing apparatus 14 are registered. Further, the templates are classified into a plurality of categories according to, for example, content of the pictures, and an answer phrase associated with the content of each picture is registered therein.

At a timing at which the data communication unit 57 receives the message sent from the sending-side information processing apparatus 13, the user notification unit 54 displays, on the display unit 55, a reception notification screen that notifies the receiver of reception of the message. For example, as shown in FIG. 6, a button 62 displaying "View" and a button 63 displaying "Later" are displayed on a reception notification screen 61, together with a phrase "You've got a message with picture." in a speech balloon of a character of the communication support system. The button 62 is operated by the receiver when the message is immediately viewed, and the button 63 is operated by the receiver when the message is viewed later.

The phrase acquiring unit 52 acquires the message, which is sent from the sending-side information processing apparatus 13 via the data communication unit 57. When the receiver views the message, the phrase acquiring unit 52 selects a predetermined number of answer phrases, which are used as a reply message sent back from the receiver, from the templates stored in the storage unit 51 and supplies the predetermined number of answer phrases to the reply content option creating unit 53.

For example, in the case where a picture is attached to the received message, the phrase acquiring unit 52 performs image recognition on the picture and selects an answer phrase associated with the content of the picture recognized. At that time, as described above, the templates have registered phrases that are classified into a plurality of categories according to the content of pictures, and the phrase acquiring unit 52 acquires an answer phrase, as a candidate to be sent back, from a category corresponding to the content of the recognized picture. Further, in the case where the phrase acquiring unit 52 has not recognized the content of the picture, the phrase acquiring unit 52 acquires a phrase independent of the content of the picture. Alternatively, in the case where a picture is not attached to the received message, the phrase acquiring unit 52 randomly selects a general answer phrase from the templates.

The reply content option creating unit 53 creates reply content options constituted of the answer phrases supplied from the phrase acquiring unit 52, and displays, on the display unit 55, a reply content selection screen for causing the receiver to select a reply content option to be sent back from the predetermined number of reply content options.

Figure 7:
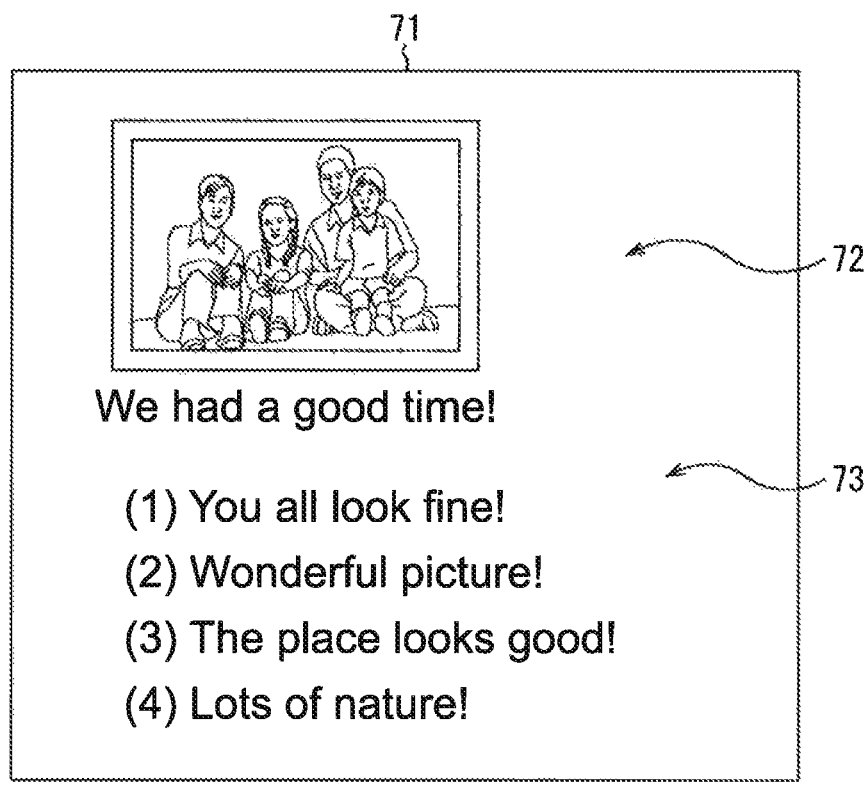
FIG. 7 is a diagram showing a display example of a reply content selection screen.

For example, FIG. 7 shows an example of a reply content selection screen 71 that displays the received message and prompts selection of reply content. In the reply content selection screen 71 of FIG. 7, a message 72 in which a picture of a family on their trip and a phrase associated with the content of the picture "We had a good time!" are combined is displayed, and four reply content options are also displayed in a reply content display area 73. In the reply content display area 73, "You all look fine!" is displayed as the first reply content option, "Wonderful picture!" is displayed as the second reply content option, "The place looks good!" is displayed as the third reply content option, and "Lots of nature!" is displayed as the fourth reply content option, in association with the content of the picture of the message 72.

Figure 6:
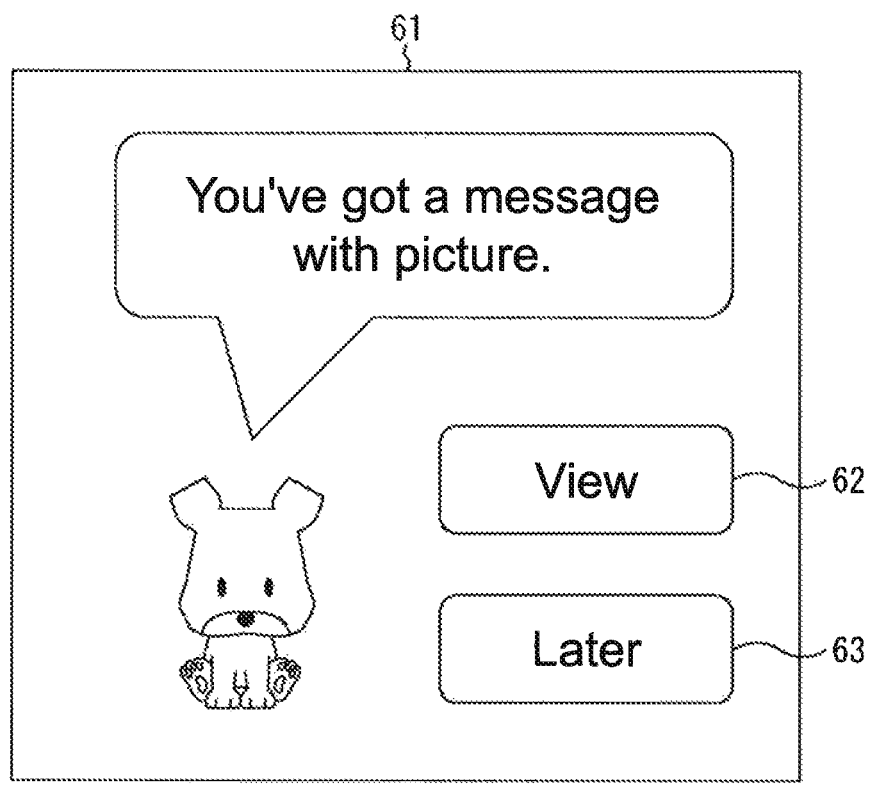
FIG. 6 is a diagram showing a display example of a reception notification screen.

The display unit 55 is constituted of, for example, a liquid crystal display or an organic EL display, and displays the reception notification screen 61 of FIG. 6, the sending content selection screen 41 of FIG. 7, and the like.

The operation unit 56 is constituted of a touch panel, a button, a microphone, and the like, and makes a determination based on an operation input according to an operation of the sender. For example, when the receiver makes an operation (for example, touch) on the button 62 displayed on the reception notification screen 61 of FIG. 6, the operation unit 56 determines that the receiver has made an operation input to immediately view the message. Further, for example, when the sender specifies any of the reply content options (e.g., reads a number of a reply content option) displayed on the reply content selection screen 71 of FIG. 7, the operation unit 56 determines that the specified reply content is a reply target.

The data communication unit 57 performs communication with the sending-side information processing apparatus 13 and the server 15 via the network 12 of FIG. 1 and, for example, receives a message sent from the receiving-side information processing apparatus 14 and supplies the message to the phrase acquiring unit 52 and the user notification unit 54. Further, the data communication unit 57 sends a reply message of the reply content, which is specified as a reply target by the receiver from the reply content selection screen 71.

It should be noted that the reply message sent from the data communication unit 57 is received by the data communication unit 29 of the sending side information processing apparatus 13 of FIG. 2 and supplied to the user notification unit 23. The user notification unit 23 issues a notification to prompt viewing of that reply message. In the sending-side information processing apparatus 13, sending content options for prompting the sender who has viewed the reply message to send an appropriate message corresponding to the reply content are displayed on the display unit 27, and continuous communication is prompted.

The receiving-side information processing apparatus 14 is configured in such a manner and can send a reply message to the receiver by a simpler operation and appropriately prompt communication with the sender.

It should be noted that the answer phrase acquired by the phrase acquiring unit 52 may be acquired on the basis of, in addition to the content of the picture described above, for example, attributes of the receiver (profile such as age, personality, hobby, or preference), history of answer phrases acquired in the past, and a period in which a reply message is sent (date and time, season, day on which an event is held, etc.). For example, in the case where a reply message is sent on the Children's Day, selecting such a phrase that asks a picture of a child can prompt more active communication.

Further, the receiving-side information processing apparatus 14 can detect a facial expression, nodding (gesture), the line of sight, and the like of the receiver when viewing a picture, for example, with use of a sensor (not shown in the figure), and on the basis of those detection results, the phrase acquiring unit 52 can acquire an answer phrase. For example, measuring the degree of interest (preference) of the receiver to the picture from those detection results and changing the answer phrase depending on the degree of interest can lead to communication consistent with the feeling of the receiver. Alternatively, the receiving-side information processing apparatus 14 may display a list of pictures on the display unit 55 and detect the line of sight of the receiver, to thus select a reply message for a picture that the receiver is interested in.

Figure 8:
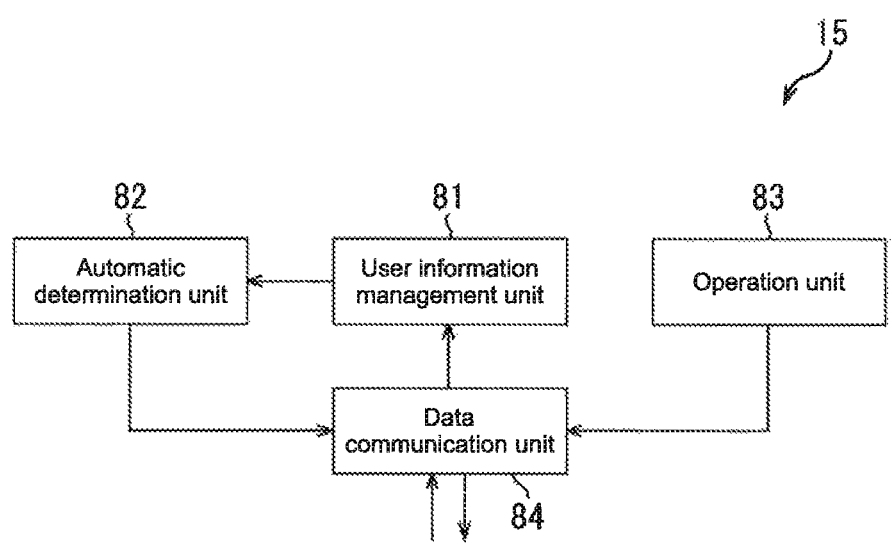
FIG. 8 is a block diagram showing a configuration example of a server.

Next, FIG. 8 is a block diagram showing a configuration example of the server 15 of FIG. 1.

As shown in FIG. 8, the server 15 includes a user information management unit 81, an automatic determination unit 82, an operation unit 83, and a data communication unit 84.

The user information management unit 81 manages user information that is referred to when the automatic determination unit 82 determines whether a timing to send a sending prompting notification to the sending-side information processing apparatus 13 has come. For example, in the format of the user information managed by the user information management unit 81, a sending user ID (Identification) for identifying a user of the sending-side information processing apparatus 13, a receiving user ID for identifying a user of the receiving-side information processing apparatus 14 as the other party of communication with the user identified by the above ID, content data that accumulates content of messages sent and received between the users, time-series data in which time series of those messages are accumulated, and the like are managed.

Further, as the content data, a message ID for identifying a sent and received message, a sender ID for identifying a sender who has sent the message, sending content (picture, phrase, etc.) sent by the massage, a receiver ID for identifying a receiver who has received the message, content (answer phrase) of a reply message with respect to the message, and the like are managed. Furthermore, as the time-series data, a message ID for identifying a sent and received message, a trigger (the sending opportunity determining unit 22 or the automatic determination unit 82) that determines a timing to issue a notification sending a message, a time of day at which a sending prompting notification is issued, a sending time of day at which a message is sent, a receiving time of day at which a received message is displayed, a reply time of day at which a reply message is sent, and the like are managed.

The automatic determination unit 82 analyzes the user information managed in the user information management unit 81 and, in search of an optimal timing to issue a notification of sending a message, automatically determines whether to issue a notification. In the case where the automatic determination unit 82 determines an optimal timing to issue a notification of sending a message has come, the automatic determination unit 82 sends a sending prompting notification to the sending-side information processing apparatus 13 via the data communication unit 84. For example, the automatic determination unit 82 may issue a notification in a spare time of the receiver on the basis of the user information of the receiver, or may issue a notification at a timing at which a message is likely to be displayed.

Further, the automatic determination unit 82 can analyze a preference of the user to the content of a message and periodically send the content of the analyzed preference to the sending-side information processing apparatus 13 via the data communication unit 84. This enables improvement in accuracy of creation of a message in the sending-side information processing apparatus 13, that enables creation of a message consistent with a user preference. Further, on the basis of this analysis result, the user information management unit 81 can determine information (for example, the increased number described above) that is referred to when the sending opportunity determining unit 22 of FIG. 2 determines a timing to issue a notification of sending a message, and can send the information to the sending-side information processing apparatus 13 via the data communication unit 84.

The operation unit 83 is constituted of, for example, a keyboard and a mouse, and is operated by a system provider who puts the communication support system 11 into practice. For example, when the system provider performs an operation to issue a notification of sending a message, the operation unit 83 sends a sending prompting notification to the sending-side information processing apparatus 13 via the data communication unit 84. In such a manner, in the communication support system 11, it is possible to prompt sending of a message on the basis of an automatic determination of the sending opportunity determining unit 22 or the automatic determination unit 82 and also prompt sending of a message on the basis of a determination of the system provider.

The data communication unit 84 perform communication with the sending-side information processing apparatus 13 and the receiving-side information processing apparatus 14 via the network 12 of FIG. 1, and sends a sending prompting notification to the sending-side information processing apparatus 13. Further, the data communication unit 84 acquires a message sent and received between the sending-side information processing apparatus 13 and the receiving-side information processing apparatus 14 and supplies the message to the user information management unit 81.

The server 15 is configured in such a manner and can send a sending prompting notification to the sending-side information processing apparatus 13, to thus appropriately prompt the sender to send a message and proactively support continuous communication between the sender and the receiver.

It should be noted that, for example, information (the degree of interest in picture) on a reaction of a receiver with respect to a sent picture may be used as the user information managed in the user information management unit 81. For example, in the case where the detection results as described above can be obtained with use of a sensor (not shown in the figure) of the receiving-side information processing apparatus 14, the detection results can be sent to the server 15, and the user information management unit 81 can acquire the detection results as the degree of interest in picture. Using such user information and reflecting the user information in subsequent communication (for example, content of picture to be selected, phrase to be acquired, etc.) can lead to communication attracting the interest of the receiver.

Figure 9:
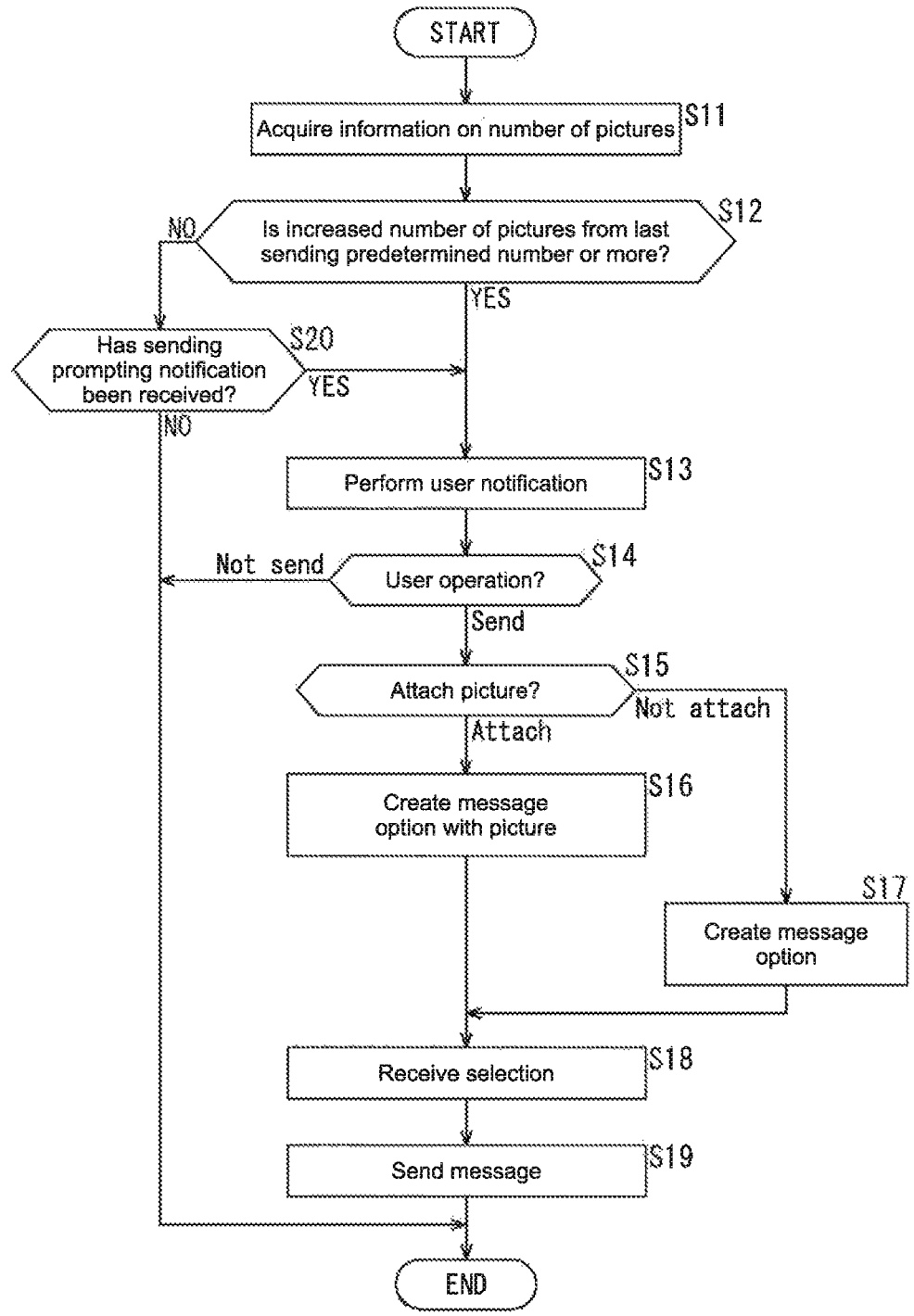
FIG. 9 is a flowchart for describing message sending processing.

Next, FIG. 9 is a flowchart for describing message sending processing in the sending-side information processing apparatus 13.

For example, the sending-side information processing apparatus 13 is set so as to periodically perform the message sending processing. When the processing is started, in Step S11, the sending opportunity determining unit 22 acquires information on the number of pictures, which indicates the number of pictures stored in the storage unit 21.

In Step S12, according to the information on the number of pictures, which is acquired in Step S11, the sending opportunity determining unit 22 determines whether an increased number of pictures increased from the last sending is a predetermined number or more.

In Step S12, in the case where the sending opportunity determining unit 22 determines that the increased number is the predetermined number or more, the processing proceeds to Step S13, and the sending opportunity determining unit 22 instructs the user notification unit 23 to perform user notification to send a message. In response to this, the user notification unit 23 displays the sending prompting notification screen 31, as shown in FIG. 3 described above, on the display unit 27, to perform user notification.

In Step S14, the operation unit 28 determines whether to send a message or not on the basis of a user operation. For example, in the case where an operation is made on the button 32 displaying "Send" in the sending prompting notification screen 31, the operation unit 28 determines to send a message. Meanwhile, in the case where an operation is made on the button 33 displaying "Not send" in the sending prompting notification screen 31, the operation unit 28 determines not to send a message, and the processing is terminated.

In the case where it is determined in Step S14 that a message is to be sent, the processing proceeds to Step S15, and the operation unit 28 determines whether to attach a picture on the basis of a user operation. For example, a question "Attach picture?" and buttons displaying "Yes" and "No" are displayed on the display unit 27, and the operation unit 28 make a determination on the basis of an operation made on those buttons.

In Step S14, in the case where the operation unit 20 determines to attach a picture, the processing proceeds to Step S16, and the sending content option creating unit 26 creates message options with pictures. It should be noted that the processing of Step S16 will be described later with reference to FIG. 10.

Meanwhile, in Step S14, in the case where the operation unit 28 determines not to attach a picture, the processing proceeds to Step S17, and the sending content option creating unit 26 creates message options including only phrases selected by the phrase acquiring unit 25.

After the processing of Step S16 or S17, the processing proceeds to Step S18, and the sending content option creating unit 26 displays the message options, which are created in Step S16 or S17, on the display unit 27 by the sending content selection screen 41 as shown in FIG. 4 described above. The operation unit 28 then receives a selection by the sender.

In Step S19, the operation unit 28 sets a sending content option, which is selected by the sender in Step S18, as a sending target, and causes a message to be sent via the data communication unit 29. The processing is then terminated.

Meanwhile, in Step S12, in the case where the sending opportunity determining unit 22 determines that the increased number is not the predetermined number or more (is less than the predetermined number), the processing proceeds to Step S20, and the data communication unit 29 determines whether a sending prompting notification sent from the server 15 has been received or not. In the case where the data communication unit 29 determines that a sending prompting notification has been received, the processing proceeds to Step S13, and processing similar to that described above is hereinafter performed. Meanwhile, in Step S20, in the case where the data communication unit 29 determines that a sending prompting notification has not been received, the processing is terminated.

Figure 10:
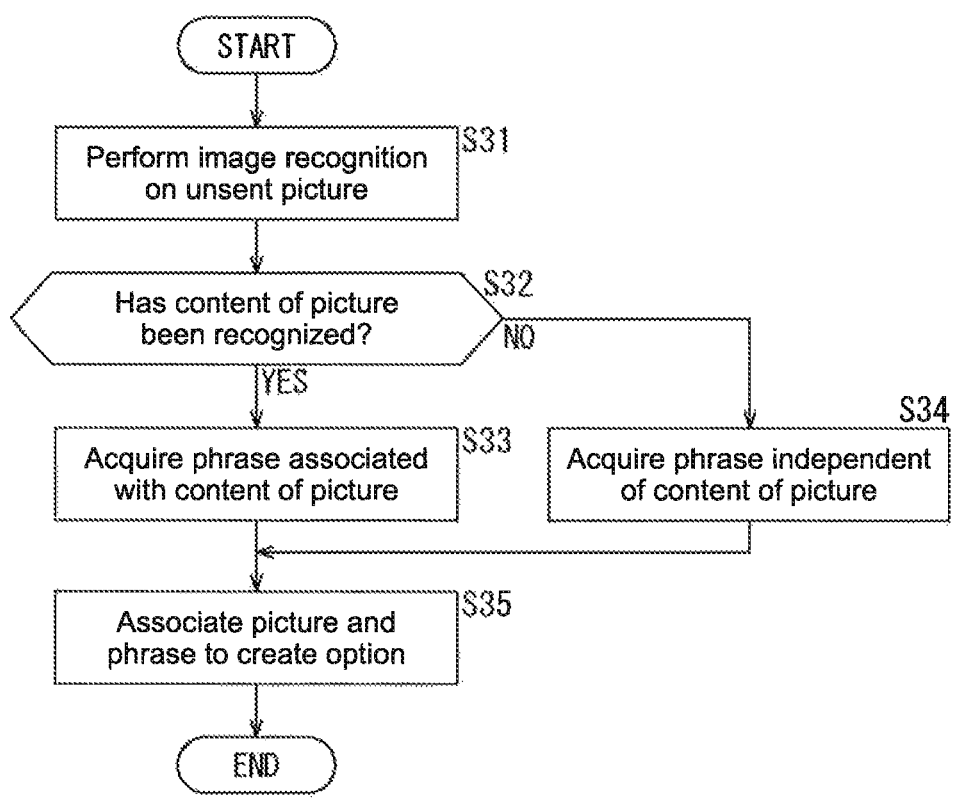
FIG. 10 is a flowchart for describing processing of creating a message option with a picture.

Next, FIG. 10 is a flowchart for describing processing of creating message options with pictures in Step S16 of FIG. 9.

In Step 331, the picture choosing unit 24 accesses the storage unit 21 to randomly select one unsent picture, which has not been sent to the receiver, and performs image processing on that picture to recognize what is shown up, i.e., content of the picture.

In Step S32, the picture choosing unit 24 determines whether the content of the picture selected in the processing of Step 231 has been recognized or not.

In Step S32, in the case where the picture choosing unit 24 determines that the content of the picture has been recognized, the processing proceeds to Step S33, and the phrase acquiring unit 25 randomly selects a phrase associated with the content of the picture from the templates stored in the storage unit 21. For example, for a picture of a child, a phrase such as "He's grown up, right?" and "Always full energy." is selected.

Meanwhile, in Step S32, in the case where the picture choosing unit 24 determines that the content of the picture has not been recognized, the processing proceeds to Step S34, and the phrase acquiring unit 25 randomly selects a phrase independent of the content of the picture from the templates stored in the storage unit 21. For example, in this case, a phrase such as "I took such a picture." or "Good picture, right?" is selected.

After the processing of Step 33 or S34, the processing proceeds to Step S35. The sending content option creating unit 26 associates the picture selected in Step S31 and the phrase acquired in Step S33 or S34 to create a sending content option, and the processing is terminated.

It should be noted that the processing is repeated in accordance with the number of sending content options displayed in the sending content selection screen 41, and when the sending content options in such a number are created, the processing is terminated and proceeds to Step S18 of FIG. 9.

Figure 11:
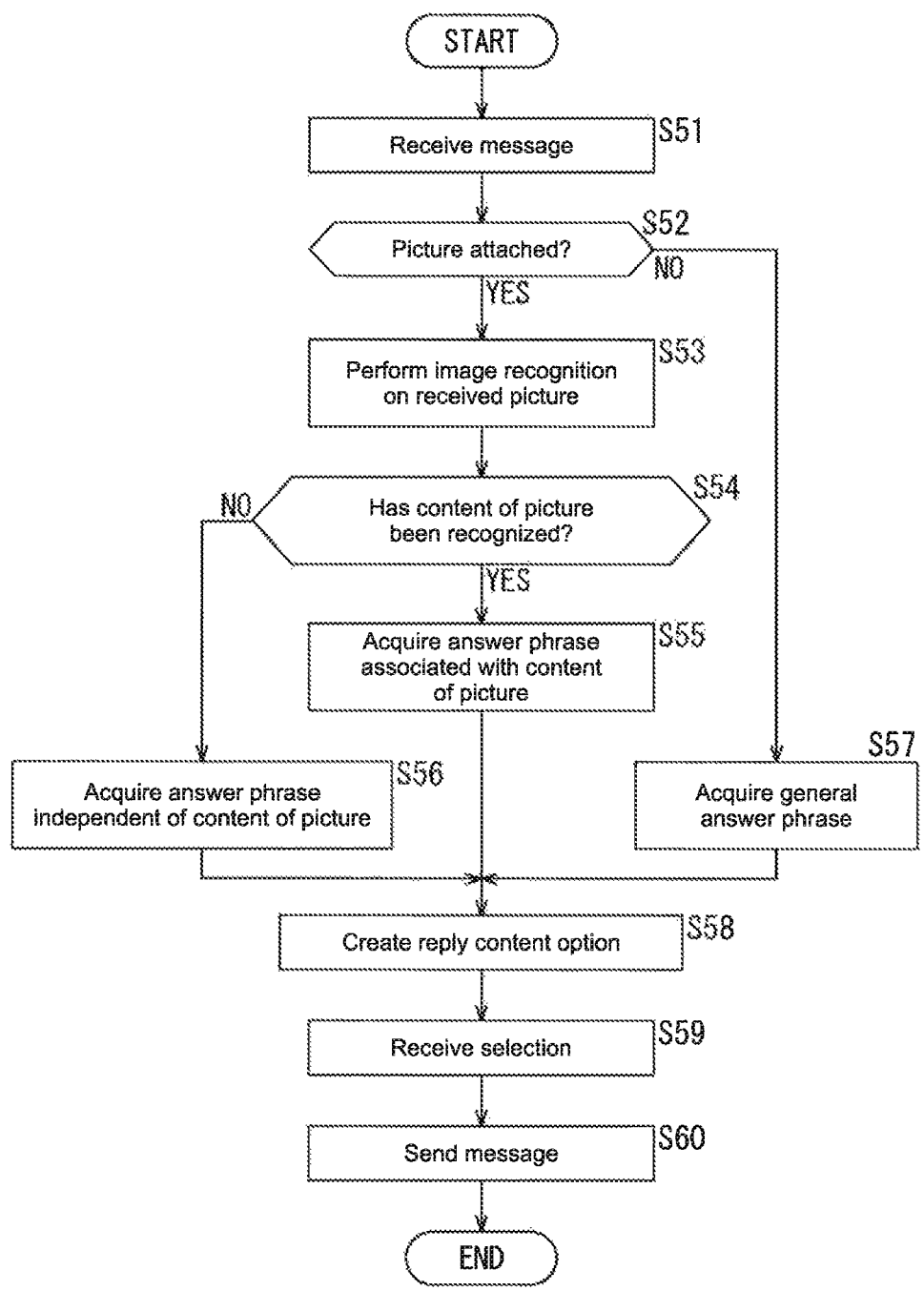
FIG. 11 is a flowchart for describing message response processing.

Next, FIG. 11 is a flowchart for describing message response processing in the receiving-side information processing apparatus 14.

For example, when a message is sent from the sending-side information processing apparatus 13, the processing is started. In Step S51, the data communication unit 57 receives the message. The data communication unit 57 notifies the user notification unit 54 of the reception of the message and supplies the message to the phrase acquiring unit 52.

In Step S52, the phrase acquiring unit 52 determines whether a picture is attached to the message acquired in Step S51 or not.

In Step S52, in the case where the phrase acquiring unit 52 determines that a picture is attached, the processing proceeds to Step S53, and the phrase acquiring unit 52 performs image recognition on the picture attached to the message and recognizes what is shown up, i.e., content of the picture.

In Step S54, on the basis of a result of the image recognition of Step S53, the phrase acquiring unit 52 determines whether the content of the picture has been recognized or not. It should be noted that, for example, in the case where information indicating what is shown up is attached to the picture, the phrase acquiring unit 52 may recognize the content of the picture on the basis of that information.

In Step S54, in the case where the phrase acquiring unit 52 determines that the content of the picture has been recognized, the processing proceeds to Step S55. In Step S55, on the basis of the recognition result of the content of the picture, the phrase acquiring unit 52 randomly acquires an answer phrase associated with the content of the picture from the templates stored in the storage unit 51. For example, for a recognition result indicating a picture of cooking, the phrase acquiring unit 52 acquires an answer phrase such as "It looks delicious," or "I wanna eat it."

Meanwhile, in Step S54, in the case where the phrase acquiring unit 52 determines that the content of the picture has not been recognized, the processing proceeds to Step S58. In Step S56, the phrase acquiring unit 52 randomly acquires an answer phrase independent of the content of the picture from the templates stored in the storage unit 51. For example, the phrase acquiring unit 52 acquires an answer phrase such as "I wanna see more pictures like this." or "It's funny."

Further, in Step S52, in the case where the phrase acquiring unit 52 determines that a picture is not attached, the processing proceeds to Step S57, and the phrase acquiring unit 52 randomly acquires a general answer phrase from the templates stored in the storage unit 51. For example, the phrase acquiring unit 52 acquires an answer phrase such as "Come and see me once in a while." or "You enjoy every day."

After the processing of Step S55, Step S56, or Step S57, the processing proceeds to Step S58, and the reply content option creating unit 53 creates a reply content option including the answer phrase acquired by the phrase acquiring unit 52.

In Step S59, the reply content option creating unit 53 displays the reply content option, which is created in Step S58, on the display unit 55 by the reply content selection screen 71 as shown in FIG. 7 described above. The operation unit 56 then receives a selection by a replier to the reply content selection screen 71 displayed on the display unit 55.

In Step S60, the operation unit 28 sets the reply content option, which is selected by the replier in Step S59, as a reply target, and causes a reply message to be sent via the data communication unit 57. The processing is then terminated.

Figure 12:
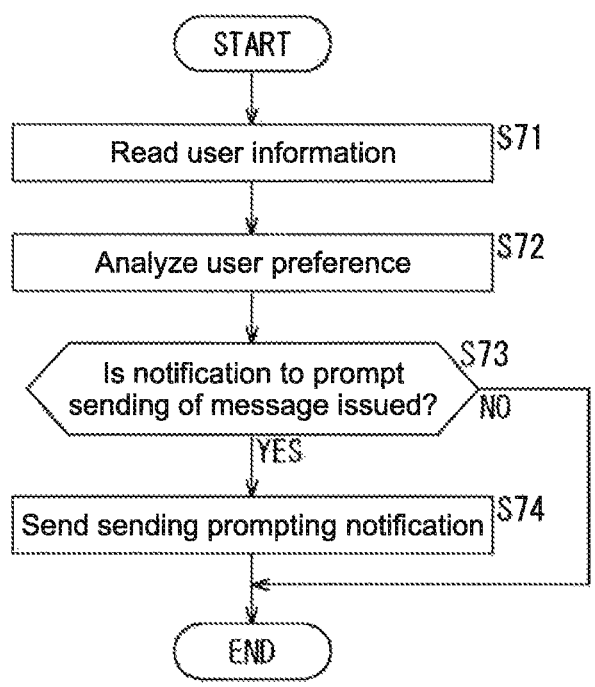
FIG. 12 is a flowchart for describing sending prompting notification processing.

Next, FIG. 12 is a flowchart for describing sending prompting notification processing in the server 15.

For example, the server 15 is set so as to periodically perform the sending prompting notification processing. When the processing is started, in Step S71, the automatic determination unit 82 reads the user information from the user information management unit 81.

In Step S72, the automatic determination unit 82 analyzes a user preference on the basis of the user information read in Step S71.

In Step S73, the automatic determination unit 82 determines whether to issue a notification to prompt sending of a message according to an analysis result in Step S72.

In Step S73, in the case where it is determined that a notification to prompt sending of a message is issued, the processing proceeds to Step S74, and the automatic determination unit 82 sends a sending prompting notification to the sending-side information processing apparatus 13 via the data communication unit 84.

Meanwhile, in Step S73, in the case where it is determined that a notification to prompt sending of a message is not issued or after the processing of Step S74 is performed, the processing is terminated.

Through each of the processing as described above, in the communication support system 11, continuous communication between a sender and a receiver can be proactively supported. For example, the sender only needs to send a message at a timing at which the sender is prompted to send the message without intending to voluntarily send the message, and interrupted communication can be avoided. Further, both of the sender and the receiver can perform communication by merely selecting an option. This can relieve psychological or physical loads and improve continuity of communication.

It should be noted that in the above-mentioned embodiment, the example in which the user notification unit 23 of FIG. 2 displays the sending prompting notification screen 31 on the display unit 27 has been described, but for example, it may be possible to use a not function of oscillations, sounds, emission of light, or the like and perform control on the notification function such that a notification linked to the content of the notification is issued, to notify the sender of prompting of sending of a message. Further, for example, it is possible to notify the sender of prompting of sending of a message by a facial expression, a motion, or the like of a character displayed on the display unit 27. In such a manner, if the sender can be notified of prompting of sending of a message, a method thereof is not limited.

Further, the operation unit 28 of FIG. 2 can receive an operation input by detecting sounds, a gesture, the line of sight, or the like, in addition to receiving an operation input on the basis of an operation made on a button displayed on the display unit 27 as described above. Further, the same holds true for the operation unit 56 of FIG. 5. In such a manner, if an intention of the sender or receiver can be received, a method thereof is not limited.

Further, in the message sending processing of FIG. 9, for example, it may also be possible to display one message of the message options with pictures on the display unit 27 and perform an operation input on whether that message is sent or not, instead of causing the sender to make an operation input in order on the presence/absence of sending of a message or the presence/absence of an attached picture.

Moreover, it may be possible to reselect a picture or a phrase or enable the sender to edit a phrase, not select one from only the determined options as in the sending content selection screen 41 of FIG. 4. For example, it is possible to add a button displaying "Display more options" to the sending content selection screen 41 and, when an operation is made on that button, display a new option.

Further, in the templates stored in the storage unit 21 of FIG. 2 or the storage unit 51 of FIG. 5, for example, newly added or edited phrases can be registered (updated) as appropriate in addition to the phrases previously registered when the system is provided. Further, those phrases can be automatically changed in expression (how to talk) in accordance with the first person, age, gender, personality, or the like of the sender or receiver.

It should be noted that in the communication support system 11, the functions of the respective sending-side information processing apparatus 13, receiving-side information processing apparatus 14, and server 15 may be provided to any of the sending-side information processing apparatus 13, the receiving-side information processing apparatus 14, and the server 15. For example, the sending-side information processing apparatus 13 may include the user information management unit 81 and the automatic determination unit 82 and may notify the sending-side information processing apparatus 13 itself of a determination result by the automatic determination unit 82. In other words, the functions as described above only need to be provided as the whole communication support system 11. Further, one apparatus may have both functions of the sending-side information processing apparatus 13 and the receiving-side information processing apparatus 14, and apparatuses capable of sending and reception and having the same function can be used on the sending side and the receiving side. As a matter of course, an apparatus dedicated to any sending or receiving function may be used.

Moreover, in addition to a tablet terminal, for example, various apparatuses capable of displaying a message and receiving an operation input, such as a smartphone terminal similar to the sending-side information processing apparatus 13, a television receiver, a projector, and a digital photo frame, can be used as the receiving-side information processing apparatus 14. Alternatively, for example, an information terminal or the like installed in public facilities or the like can be used as the receiving-side information processing apparatus 14.

It should be noted that each of the processing described with reference to the flowcharts described above does not necessarily need to be processed chronologically along the order described as the flowcharts and also includes processing executed in parallel or independently (for example, parallel processing or processing by objects). Further, the program may be processed by one CPU or may be subjected to distributed processing by a plurality of CPUs.

Further, the series of processing described above (information processing method) can be executed by hardware or software. In the case where the series of processing is executed by software, programs constituting the software are installed from a program recording medium in which the programs are recorded, in a computer incorporated into dedicated hardware, a general-purpose personal computer that can execute various functions by installing various programs therein, or the like.

Figure 13:
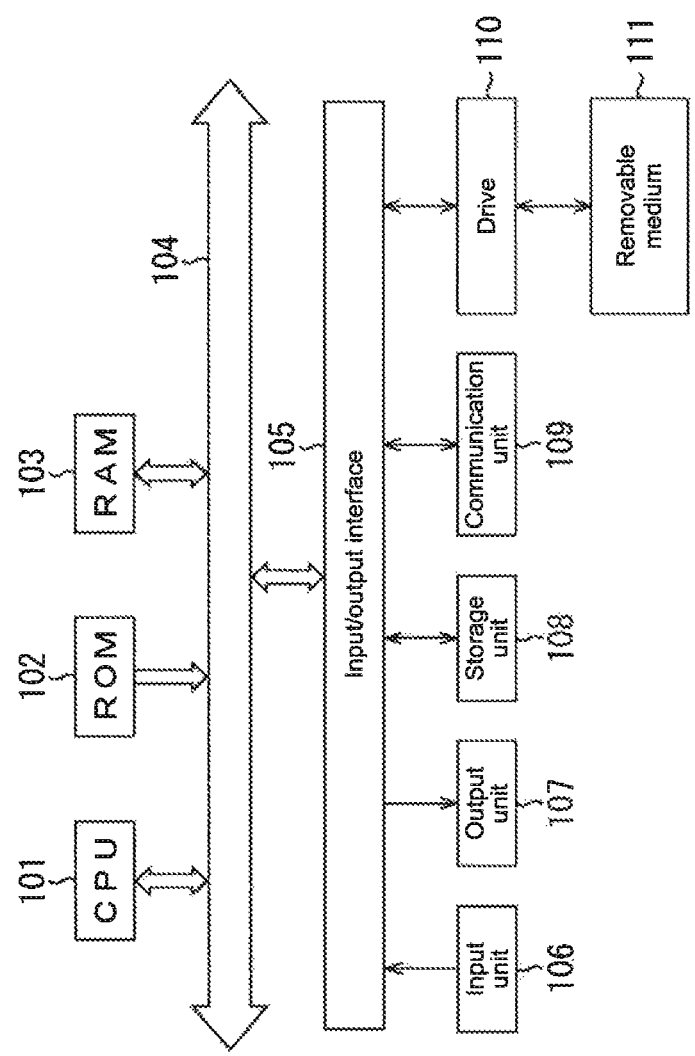
FIG. 13 is a block diagram showing a configuration example of one embodiment of a computer to which the present technology is applied.

FIG. 13 is a block diagram showing a hardware configuration example of a computer that executes the series of processing described above by a program.

In the computer, a CPU (Central Processing Unit) 101, a ROM (Read Only Memory) 102, and a RAM (Random Access Memory) 103 are connected to one another via a bus 104.

Moreover, an input/output interface 105 is connected to the bus 104. Connected to the input/output interface 105 are an input unit 106 constituted of a keyboard, a mouse, a microphone, and the like, an output unit 107 constituted of a display, a speaker, and the like, a storage unit 108 constituted of a hard disk, a nonvolatile memory, and the like, a communication unit 109 constituted of a network interface and the like, and a drive 110 that drives a removable medium 111 such as a magnetic disk, an optical disc, a magneto-optical disk, or a semiconductor memory.

In the computer configured as described above, the CPU 101 loads the program stored in, for example, the storage unit 108 to the RAM 103 via the input/output interface 105 and the bus 104 and executes the program, to perform the series of processing described above.

The program executed by the computer (CPU 101) can be provided by, for example, being recorded on the removable medium 111 as a package medium constituted of a magnetic disk (including a flexible disc), an optical disc (CD-ROM (Compact Disc-Read Only Memory), a DVD (Digital Versatile Disc) etc.), a magneto-optical disk, a semiconductor memory, or the like, or provided via a wired or wireless transmission medium such as a local area network, the Internet, and digital satellite broadcasting.

When the removable medium 111 is mounted to the drive 110, the program can be installed in the storage unit 108 via the input/output interface 105. Further, the program can be received by the communication unit 109 via the wired or wireless transmission medium and installed in the storage unit 108. In addition, the program can be previously installed in the ROM 102 or the storage unit 108.

It should be noted that the present technology can also have the following configurations.

(1) An information processing apparatus, including:

an acquiring unit that acquires a predetermined number of message content items, as candidates to be sent, from a plurality of message content items classified as a category corresponding to an image used for communication among a plurality of categories into which the message content items are classified; and an option creating unit that creates an option for prompting a selection of the message content item to be sent from the predetermined number of message content items acquired by the acquiring unit, and exhibits the option at a predetermined timing.

(2) The information processing apparatus according to (1), further including:

a choosing unit that chooses a predetermined number of images as candidates to be sent; and a sending unit that sends a message attached with the image selected to be sent among the predetermined number of images chosen by the choosing unit, in which the acquiring unit acquires the message content items from the categories respectively corresponding to the predetermined number of images chosen by the choosing unit, and the option creating unit creates the options in which the predetermined number of images and the message content items corresponding to the images are respectively combined.

(3) The information processing apparatus according to (1) or (2), in which the message content items are classified into the categories according to content of each image, the choosing unit performs image recognition on the plurality of images stored in a storage unit that stores the images, and the acquiring unit acquires the message content items from the category according to the content of the image that can be recognized by the choosing unit.

(4) The information processing apparatus according to (3), in which the acquiring unit acquires the message content items independent of the content of the image in a case where the choosing unit has failed to recognize the content of the image.

(5) The information processing apparatus according to any one of (1) to (4), further including a sending opportunity determining unit that determines whether a timing to send the message has come, in which when the sending opportunity determining unit determines that the timing to send the message has come, the option creating unit creates and exhibits the option.

(6) The information processing apparatus according to (5), in which the sending opportunity determining unit acquires the number of images stored in the storage unit, and determines whether the timing to send the message has come according to an increased number of images increased from the last sending of the message.

(7) The information processing apparatus according to (5) or (6), further including a notification unit that issues a notification to prompt sending of the message, when the sending opportunity determining unit determines that the timing to send the message has come.

(8) The information processing apparatus according to (3), in which the choosing unit chooses the predetermined number of images, as candidates to be sent, on a basis of a result of the image recognition performed on the images, the predetermined number of images being appropriate to a sender who sends the message on the basis of the content of the image.

(9) The information processing apparatus according to any one of (2) to (8), further including an operation unit that receives an operation input on whether to send the message and an operation input on whether to attach an image to the message.

(10) The information processing apparatus according to (1), further including a receiving unit that receives a message attached with the image, in which the acquiring unit acquires the predetermined number of message content items for sending a reply to the message, from the category corresponding to the image attached to the message received by the receiving unit.

(11) The information processing apparatus according to (10), in which the option creating unit creates, at a timing at which the receiving unit has received the message, an option for prompting a selection of the message content item to be sent back and exhibits the option.

(12) The information processing apparatus according to (10) or (11), in which the acquiring unit acquires the message content items that are appropriate in accordance with an attribute of a receiver who has received the message or a period in which the message has been received.

(13) The information processing apparatus according to any one of (10) to (12), further including an operation unit that receives an operation input to select the message content item to be sent back from the options exhibited by the option creating unit.

(14) The information processing apparatus according to (1), further including a user information management unit that manages, as user information, a sender who sends the message, a receiver to be the other party who the message is sent to, content data in which the message content items are accumulated, and time-series data in which time series of the sent messages are accumulated.

(15) The information processing apparatus according to (14), further including:

a determining unit that analyzes the user information managed by the user information management unit and determines an appropriate timing to prompt sending of the message; and a notification sending unit that sends a notification to prompt sending of the message, in a case where the determining unit determines that an appropriate timing has come.

(16) An information processing method, including the steps of:

acquiring a predetermined number of message content items, as candidates to be sent, from a plurality of message content items classified as a category corresponding to an image used for communication among a plurality of categories into which the message content items are classified; and creating an option for prompting a selection of the message content item to be sent from the acquired predetermined number of message content items, and exhibiting the option at a predetermined timing.

(17) A program causing a computer to execute processing including the steps of:

acquiring a predetermined number of message content items, as candidates to be sent, from a plurality of message content items classified as a category corresponding to an image used for communication among a plurality of categories into which the message content items are classified; and creating an option for prompting a selection of the message content item to be sent from the acquired predetermined number of message content items, and exhibiting the option at a predetermined timing.

(18) An information processing system, including:

a sending-side information processing apparatus including a choosing unit that chooses the predetermined number of images as candidates to be sent, a sending content acquiring unit that acquires a predetermined number of message content items, as candidates to be sent, from a plurality of message content items classified as categories respectively corresponding to the predetermined number of images chosen by the choosing unit, among a plurality of categories into which the message content items are classified, an option creating unit that creates the option for prompting a selection of a message to be sent from the messages in which the predetermined number of images and the predetermined number of message content items are respectively combined, and exhibits the option at a predetermined timing, the predetermined number of message content items corresponding to the images and being acquired by the acquiring unit, and a sending unit that sends the message selected to be sent among the options; and a receiving-side information processing apparatus including a receiving unit that receives a message attached with the image, and a reply content acquiring unit that acquires the predetermined number of message content items for sending a reply to the message, from the category corresponding to the image attached to the message received by the receiving unit.

It should be noted that this embodiment is not limited to the embodiment described above and can be variously modified without departing from the gist of the present disclosure.

REFERENCE SIGNS LIST

11 communication support system
12 network
13 sending-side information processing apparatus
14 receiving-side information processing apparatus
15 server
21 storage unit
22 sending opportunity determining unit 23 user notification unit
24 picture choosing unit
25 phrase acquiring unit
26 sending content option creating unit
27 display unit
28 operation unit
29 data communication unit
51 storage unit
52 phrase acquiring unit
53 reply content option creating unit
54 user notification unit
55 display unit
56 operation unit
57 data communication unit
81 user information management unit
82 automatic determination unit
83 operation unit
84 data communication unit

The invention claimed is:

1. An information processing apparatus, comprising:
circuitry configured to:
determine a plurality of images as candidates;
acquire a plurality of phrases as candidates based on categories respectively corresponding to the plurality of images;
create options for selection in which the plurality of phrases corresponding to the images are respectively combined;
receive an operation input on whether to send a message or attach at least one image to the message; and
control a communication unit to send the message with the at least one image selected among the plurality of images, in a case where the operation input to attach the at least one image to the message is received.

2. The information processing apparatus according to claim 1, wherein
the phrases are classified into the categories according to content of the images,
the circuitry is further configured to perform image recognition on the plurality of images, and acquire the plurality of phrases from the category according to content of the image recognized based on the performed image recognition.

3. The information processing apparatus according to claim 2, wherein
the plurality of phrases are acquired independent of the content of the image in a case where the content of the image is failed to be recognized.

4. The information processing apparatus according to claim 2, wherein the circuitry is further configured to:
determine whether a timing to send the message has come; and
when the timing to send the message has been determined to come, create and exhibit the options for selection.

5. The information processing apparatus according to claim 4, wherein the circuitry is further configured to:
determine whether the timing to send the message has come according to an increased number of images increased from the last sending of the message.

6. The information processing apparatus according to claim 4, wherein the circuitry is further configured to:
issue a notification to prompt sending of the message, when the timing to send the message has been determined to come.

7. The information processing apparatus according to claim 2, wherein the plurality of images are determined as candidates to be sent, on a basis of a result of the image recognition performed on the plurality of images, the plurality of images being appropriate to a sender who sends the message via the communication unit on the basis of the content of the image.

8. The information processing apparatus according to claim 1, wherein the circuitry is further configured to:
manage, as user information, a sender who sends the message via the communication unit, a receiver to be the other party who the message is sent to, content data in which the phrases are accumulated, and time-series data in which time series of the sent messages are accumulated.

9. The information processing apparatus according to claim 8, wherein the circuitry is further configured to:
analyze the managed user information and determine an appropriate timing to prompt sending of the message; and
send a notification to prompt sending of the message, in a case where an appropriate timing has been determined to come.

10. The information processing apparatus according to claim 1, wherein
the communication unit comprises a network interface that communicably connects to a network via a wired or wireless transmission medium.

11. The information processing apparatus according to claim 1, wherein
the communication unit sends the message to a receiving-side information processing apparatus or to a server, via a network.

12. An information processing method, comprising:
determining a plurality of images as candidates;
acquiring a plurality of phrases as candidates based on categories respectively corresponding to the plurality of images;
creating options for selection in which the plurality of phrases corresponding to the images are respectively combined;
receiving an operation input on whether to send a message or attach at least one image to the message; and
sending, via a communication unit, the message with the at least one image selected among the plurality of images, in a case where the operation input to attach the at least one image to the message is received.

13. A non-transitory computer-readable medium having embodied thereon a program, which when executed by a computer causes the computer to execute a method, the method comprising:
determining a plurality of images as candidates;
acquiring a plurality of phrases as candidates based on categories respectively corresponding to the plurality of images;
creating options for selection in which the plurality of phrases corresponding to the images are respectively combined;
receiving an operation input on whether to send a message or attach at least one image to the message; and
sending, via a communication unit, the message with the at least one image selected among the plurality of images, in a case where the operation input to attach the at least one image to the message is received.

14. An information processing system, comprising:
a sending-side information processing apparatus including circuitry configured to
determine a plurality of images as candidates, acquire a plurality of phrases as candidates based on categories respectively corresponding to the plurality of images, create options for selection in which the plurality of phrases corresponding to the images are respectively combined, receive an operation input on whether to send a message or attach at least one image to the message, and control a communication unit of the sending-side information processing apparatus to send the message with the at least one image selected among the plurality of images, in a case where the operation input to attach the at least one image to the message is received; and a receiving-side information processing apparatus including circuitry configured to receive, via a communication unit of the receiving-side information processing apparatus, the message with the at least one image, and acquire the plurality of phrases for sending a reply to the message, from a category corresponding to the at least one image of the received message.

\* \* \* \* \*